(12) United States Patent
Ukuda

(10) Patent No.: US 6,830,346 B2  
(45) Date of Patent: Dec. 14, 2004

(54) OPTICAL ELEMENT AND OPTICAL EQUIPMENT INCORPORATING THE SAME

(75) Inventor: Hideo Ukuda, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/216,195

(22) Filed: Aug. 12, 2002

(65) Prior Publication Data

US 2003/0030907 A1 Feb. 13, 2003

(30) Foreign Application Priority Data

Aug. 10, 2001 (JP) .................. 2001-243546  
Jul. 31, 2002 (JP) .................. 2002-223128

(51) Int. Cl.⁷ .................................. G02B 1/00  
(52) U.S. Cl. .................................. 359/507  
(58) Field of Search .................. 359/507, 582, 359/580

(56) References Cited

U.S. PATENT DOCUMENTS

| | | | |
|---|---|---|---|
| 5,976,680 A | 11/1999 | Ikemori et al. | 428/212 |
| 6,055,376 A * | 4/2000 | Ohtaka et al. | 396/51 |
| 6,287,683 B1 | 9/2001 | Ito et al. | 428/336 |
| 6,352,758 B1 * | 3/2002 | Huang et al. | 429/143 |
| 6,394,613 B1 | 5/2002 | Hatakeyama et al. | 359/507 |
| 6,420,020 B1 | 7/2002 | Yamazaki et al. | 428/336 |
| 2003/0030909 A1 | 2/2003 | Ukuda | 359/582 |

FOREIGN PATENT DOCUMENTS

| | | |
|---|---|---|
| JP | 11-109105 | 4/1999 |
| JP | 2001-74902 | 3/2001 |

OTHER PUBLICATIONS

O.S. Heavens, *Optical Properties of Thin Solid Films*, p. 217 (Dover Publications, New York, 1991).

* cited by examiner

Primary Examiner—Euncha P. Cherry  
(74) Attorney, Agent, or Firm—Fitzpatrick, Cella, Harper & Scinto

(57) ABSTRACT

In order to provide an optical element which prevents fogging of a surface and has an antireflection characteristic and morphological stability, an optical element of the present invention includes: a substrate; and a first water absorption layer containing a water-absorbing polymer and inorganic particles, a high refractive layer, and a second water absorption layer which are formed on a substrate in this order, in which the water absorption layer is made of a material containing a mixture of a water-absorbing polymer and an inorganic substance.

17 Claims, 3 Drawing Sheets

FILM COMPOSITION, MORPHOLOGICAL STABILITY, FOG PREVENTION CHARACTERISTIC AND REFLECTION CHARACTERISTIC OF ANTIFOG AND ANTIREFLECTION OPTICAL ELEMENT

| | COMPOSITION FIGURE (ELLIPSOMETRY ANALYSIS) | | INORGANIC PARTICLE | RATE OF INORGANIC PARTICLE | MORPHOLOGICAL STABILITY (INCREASE OF NEWTON LINE) | ANTIREFLECTION CHARACTERISTIC | ANTIFOG CHARACTERISTIC |
|---|---|---|---|---|---|---|---|
| EXAMPLE 1 | | THIN WATER ABSORPTION LAYER (130nm) / TiO₂ LAYER / WATER ABSORPTION LAYER (ABOUT 4μm) SiO₂ 5% / BASE (WHITE CROWN GLASS) | SiO₂ | 5w% | ○ (Δ3 LINES) | 0.035 | ○ |
| COMPARATIVE EXAMPLE 1 | | THIN WATER ABSORPTION LAYER (130nm) / TiO₂ LAYER / WATER ABSORPTION LAYER (ABOUT 4μm) SiO₂ 0% / BASE (WHITE CROWN GLASS) | ----- | ----- | Δ (Δ5 LINES) | 0.035 | ○ |
| EXAMPLE 2 | | THIN WATER ABSORPTION LAYER (130nm) / TiO₂ LAYER / WATER ABSORPTION LAYER (ABOUT 4μm) SiO₂ 20% / BASE (WHITE CROWN GLASS) | SiO₂ | 20w% | ◎ (Δ2 LINES) | 0.035 | ○ |

FIG. 1A

FILM COMPOSITION, MORPHOLOGICAL STABILITY, FOG PREVENTION CHARACTERISTIC AND REFLECTION CHARACTERISTIC OF ANTIFOG AND ANTIREFLECTION OPTICAL ELEMENT

| | COMPOSITION FIGURE (ELLIPSOMETRY ANALYSIS) | INORGANIC PARTICLE | RATE OF INORGANIC PARTICLE | MORPHOLOGICAL STABILITY (INCREASE OF NEWTON LINE) | ANTIREFLECTION CHARACTERISTIC | ANTIFOG CHARACTERISTIC |
|---|---|---|---|---|---|---|
| EXAMPLE 1 | THIN WATER ABSORPTION LAYER (130nm) / TiO₂ LAYER / WATER ABSORPTION LAYER (ABOUT 4μm) SiO₂ 5% / BASE (WHITE CROWN GLASS) | SiO₂ | 5w% | ○ (Δ3 LINES) | 0.035 | ○ |
| COMPARATIVE EXAMPLE 1 | THIN WATER ABSORPTION LAYER (130nm) / TiO₂ LAYER / WATER ABSORPTION LAYER (ABOUT 4μm) SiO₂ 0% / BASE (WHITE CROWN GLASS) | — | — | △ (Δ5 LINES) | 0.035 | ○ |
| EXAMPLE 2 | THIN WATER ABSORPTION LAYER (130nm) / TiO₂ LAYER / WATER ABSORPTION LAYER (ABOUT 4μm) SiO₂ 20% / BASE (WHITE CROWN GLASS) | SiO₂ | 20w% | ◎ (Δ2 LINES) | 0.035 | ○ |

FROM FIG. 1A

| | | | | | |
|---|---|---|---|---|---|
| EXAMPLE 3 | ▨▨▧ THIN WATER ABSORPTION LAYER (130nm) / TiO2 LAYER / WATER ABSORPTION LAYER (ABOUT 4μm) SiO2 40% / BASE (WHITE CROWN GLASS) | SiO2 | 40w% | ◎ (Δ1 LINES) | 0.035 | ○ |
| COMPARATIVE EXAMPLE 2 | ▨▨▧ THIN WATER ABSORPTION LAYER (130nm) / TiO2 LAYER / WATER ABSORPTION LAYER (ABOUT 4μm) SiO2 70% / BASE (WHITE CROWN GLASS) | SiO2 | 70w% | ◎ (Δ0 LINE) | 0.035 | △ |
| EXAMPLE 4 | ▨▨▧▧ THIN WATER ABSORPTION LAYER (130nm) / TiO2 LAYER / THIN WATER ABSORPTION LAYER (10nm) / TiO2 LAYER / WATER ABSORPTION LAYER (ABOUT 4μm) SiO2 40% / BASE (WHITE CROWN GLASS) | SiO2 | 40w% | ◎ (Δ1 LINE) | 0.020 | ○ |

OPTICAL ELEMENT AND OPTICAL EQUIPMENT INCORPORATING THE SAME

BACKGROUND OF THE INVENTION

1. Field of the Invention

The present invention relates to an antifog and antireflection optical element. In particular, the present invention relates to an optical element such as a photographic lens, a projection lens, a filter, and a mirror which is excellent in antifog, antireflection, and weather resistance, or optical equipment such as electrophotographic equipment incorporating such an optical element.

2. Related Background Art

Conventionally, for preventing fog of a lens, a filter, a mirror, and the like, a method of coating a surface with a surfactant is generally conducted. Recently, it is also known that fog is prevented by coating a base such as a lens, a filter, a mirror, or the like with a water-absorbing material instead of a surfactant. Furthermore, conventionally, natural polymers are known as a water-absorbing materials, e.g, starch-based polymers such as a starch-acrylonitrile graft polymer hydrolysate; and cellulose-based polymers such as cellulose-acrylonitrile graft polymer. Also known as water-absorbing material are synthetic polymers, e.g., polyvinyl alcohol-based polymers such as a polyvinyl alcohol cross-linked polymer; acrylic polymers such as a sodium polyacrylate cross-linked substance; polyether-based polymers such as a polyethylene glycol/diacrylate cross-linked polymer, etc.

However, the above-mentioned conventional antifog optical elements have the following problems. First, in the case where a surfactant is used for preventing fog, duration of its effect is very short, and unless the surfactant is applied again within several hours or days, its effect cannot be maintained. Furthermore, in the case where dirt on the surface of an optical element is wiped off with water or the like, a surfactant film is removed, and its effect is lost.

Furthermore, in the case where various water-absorbing materials are applied to form an antifog film for preventing fog, the duration of its effect is remarkably enhanced as compared with the case of using a surfactant. However, according to the study by the inventors of the present invention, the following was found: in the case where the water-absorbing material is used for an antifog film, when a low refractive material layer is coated onto the antifog film so as to obtain an antireflection effect, the antifog characteristic of the antifog film itself tends to be lost. Furthermore, in the case where the thickness of the water absorption film is reduced, and the thickness of an optical film is adjusted to an odd multiple of one-quarter of the wavelength of an antireflection target to obtain an antireflection film, the thickness of the water-absorbing film becomes too small, and sufficient antifog characteristic cannot be obtained.

In order to solve the above-mentioned problem, the inventors of the present invention have proposed in Japanese Patent Application Laid-Open No. 11-109105 that a film having a different refractive index is formed on a water absorption film to form an antireflection film. However, in the above-mentioned antifog and antireflection optical element, the following phenomenon is observed sometimes: when the state of containing water continues, a material in the water absorption film moves, resulting in poor surface precision.

SUMMARY OF THE INVENTION

Therefore, with the foregoing in mind, it is an object of the present invention to provide an optical element having both an antifog effect and antireflection characteristic as well as morphological stability, or to provide optical equipment in which moisture condensation or the like does not occur when incorporating the optical element therein.

These and other advantages of the present invention will become apparent to those skilled in the art upon reading and understanding the following detailed description with reference to the accompanying figures.

In order to solve the above-mentioned problems, according to a first aspect of the present invention, there is provided an optical element having an antifog characteristic, characterized by comprising: an optical component (including a simple glass substrate etc); and a first water absorption layer containing a water-absorbing polymer which is formed on the optical component, in which the first water absorption layer contains a mixture of a water-absorbing polymer and an inorganic substance.

Also, in the optical element, a rate of the inorganic substance mixed in the first water absorption layer is 5 to 60 w % (% by weight).

Also, a rate of the inorganic substance mixed in the first water absorption layer is 15 to 50 w % (% by weight).

Also, the inorganic substance is inorganic particles.

Also, the inorganic substance is $SiO_2$.

Also, the inorganic particles are mixed in the first water absorption layer as they are, that is, in the form of particles.

Also, the inorganic particles are contained in the first water absorption layer as particles having a diameter of 5 nm to 20 nm.

Also, a thickness of the first water absorption layer is 1 $\mu$m to 20 $\mu$m.

Also, there is provided an optical element characterized by further comprising a high refractive layer formed on the first water absorption layer, and a second water absorption layer containing a water-absorbing polymer which is formed on the high refractive layer.

Also, the second water absorption layer contains the inorganic substance.

Also, a thickness of the second water absorption layer is less than 1 $\mu$m.

Also, a thickness of the second water absorption layer is less than 200 $\mu$m.

Also, a plurality of antireflection layers, each consisting of the high refractive layer and the second water absorption layer that are integrally formed, may be stacked to constitute an optical element.

Also, a water-absorbing polymer in at least one of the first water absorption layer and the second water absorption layer is a polyacrylic acid or polyvinyl alcohol.

Also, an optical element is one selected from the group consisting of a filter for a photographic lens or a projection lens, a mirror, and a lens.

Also, the optical element has antireflection characteristic.

Also, the optical equipment has the above optical component.

Also, the optical element is exposed to the outside.

Also, the optical equipment is an image pickup apparatus including an image pickup optical system and a finder optical system, the finder optical system including the optical element.

Also, the optical element is an eyepiece of the finder optical system.

BRIEF DESCRIPTION OF THE DRAWINGS

FIG. 1 is comprised of FIGS. 1A and 1B showing tables for evaluation of optical elements produced in Examples 1 to 4 and Comparative Examples 1 and 2.

DETAILED DESCRIPTION OF THE PREFERRED EMBODIMENTS

Figure 2:
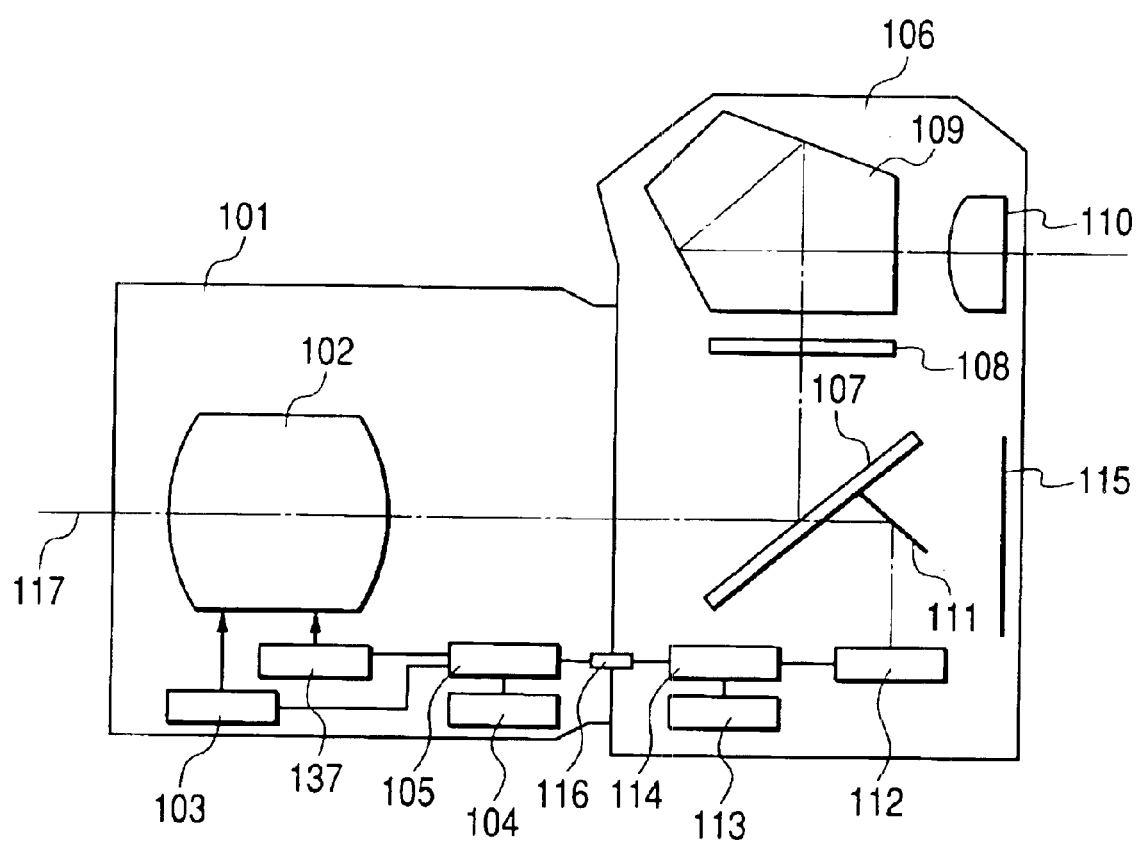
FIG. 2 is a schematic view of a camera in Example 5.

In an embodiment of the present invention, the above-mentioned configuration is adopted, in which inorganic particles are mixed in a water-absorbing polymer of the first water absorption layer so as to suppress movement of a material in the water absorption layer, whereby surface precision is prevented from being degraded. More specifically, by using a mixture of a water-absorbing polymer and inorganic particles in the first water absorption layer, it becomes possible to enhance morphological stability. At this time, when the rate of the inorganic particles is from 10 w % to 60 w %, antireflection, water absorption (water permeability), and morphological stability are not lost. Therefore, an optical element having both an antifog effect and antireflection characteristic as well as morphological stability can be provided. Furthermore, optical equipment in which moisture condensation or the like does not occur when incorporating the above-mentioned optical element therein can be provided.

In the above-mentioned composition of the present invention, as the water-absorbing polymer to be a material for the water absorption film, various conventionally known polymers shown below can be used. That is, as natural polymer derivatives, there are: starch-based polymers such as a starch-acrylonitrile graft polymer hydrolysate; and cellulose-based polymers such as cellulose-acrylonitrile graft polymer. Examples of synthetic polymers include: polyvinyl alcohol based polymers such as a polyvinyl alcohol cross-linked polymer; acrylic polymers such as a sodium polyacrylate cross-linked substance; and polyether-based polymers such as a polyethylene glycol/diacrylate cross-linked polymer. Among them, highly water-absorptive materials such as polyacrylic acids, polyvinyl alcohols, and the like are preferably used.

Examples of polyacrylic acids used here include polyacrylic acid, polymethacrylic acid, polyacrylamide, and salts thereof (potassium polyacrylate, sodium polyacrylate). Polyacrylic acid and polymethacrylic acid are preferably used.

It is preferable that inorganic particles are mixed in an amount of 5 to 60 w % into a material for the water absorption film. In the case where the rate of the inorganic particles is 5 w % or less, durability is degraded. In the case where the rate of the inorganic particles is 60 w % or more, water absorption is degraded rapidly, resulting in loss of antifog characteristic. When the rate of the inorganic particles is set to be in a range of 15 to 50 w %, a film with good balance having both durability and water absorption characteristic can be formed.

Herein, the inorganic particles are preferably present in the film as they are, that is, in the form of particles. The inorganic particles are present as particles preferably having a diameter of 3 nm to 30 nm, and more preferably having a diameter of 5 nm to 20 nm.

Herein, it is preferable that the thickness of the first water absorption film formed on a substrate is set to be 1 mm or more so as to increase the amount of its water absorption and enhance the antifog characteristic. Furthermore, a thickness of 20 mm or less is preferable so as to prevent the water absorption film from excessively expanding due to excessive water absorption. The thickness is more preferably set to be 2 mm to 8 mm.

Furthermore, the high refractive layer is obtained by soaking a base including a water absorption film in a solution containing a metal alkoxide as a main component of a dissolved substance, and pulling up the base to coat the base with the solution, followed by sintering.

Examples of the metal alkoxide include compounds represented by the following formulae (1) and (2):

$$M(OR)a \qquad (1)$$

and

$$M(OR)n(X)a-n \qquad (2)$$

where "M" is an atom selected from the group consisting of Si, Al, Ti, Zr, Ca, Fe, V, Sn, Li, Be, B, and P; "R" is an alkyl group, an alkyl group having a functional group, or a halogen; "a" is a valence of "M", and "n" is an integer of 1 to "a".

In the above, an alkyl group containing a carbonyl, carboxyl, amino, vinyl, or epoxy group is preferable as "X".

Examples of particularly preferable inorganic alkoxide include $Si(OC_2H_5)_4$, $Al(O\text{-iso-}C_3H_7)_3$, $Ti(O\text{-iso-}C_3H7)_4$, $Zr(O\text{-t-}C_4H9)_4$, $Zr(O\text{-n-}C_4H9)_4$, $Ca(OC_2H5)_2$, $Fe(OC_2H_5)_3$, $V(O\text{-iso-}C_3H_7)_4$, $Sn(O\text{-t-}C_4H_9)_4$, $Li(OC_2H_5)$, $Be(OC_2H_5)_2$, $B(OC_2H_5)_3$, $P(OC_2H_5)_2$, and $P(OCH_3)_3$. In order to decrease the reflectance of the antifog and antireflection optical element, the refractive index of the high refractive thin film is preferably 1.68 or more. For this purpose, in particular, $Al(O\text{-iso-}C_3H_7)_3$, $Ti(O\text{-iso-}C_3H_7)_4$, $Zr(O\text{-t-}C_4H_9)$, $Zr(O\text{-n-}C_4H_9)_4$, and $Sn(O\text{-t-}C_4H_9)_4$ are preferable.

A second water absorption layer is formed on the above-mentioned first water absorption layer with a high refractive layer interposed therebetween, whereby antireflection characteristics can be exhibited. Herein, the second water absorption layer can be obtained by forming a water-absorbing polymer with an optical film thickness.

Herein, although it is preferable that the second water absorption layer contains an inorganic substance, the second water absorption layer may not contain it. The thickness of the second water absorption layer is less than 1 μm. In particular, the thickness of the second water absorption layer is more desirably less than 200 nm. Furthermore, it may also be possible to stack a plurality of antireflection layers each consisting of the high refractive layer and the second water absorption layer that are integrally formed, to thereby form the optical element of the present invention.

The antifog and antireflection optical element produced by using such a procedure has an antifog characteristic, as well as an enhanced antireflection characteristic and abrasion resistance.

Furthermore, the antifog and antireflection optical element of the present invention has antifog characteristic and excellent light transmittance, and is applicable to various optical elements in which fogging occurs due to condensation of moisture.

Furthermore, the first water absorption layer may be formed on an optical component on which another film has already been formed, instead of being formed directly on a substrate such as a glass substrate and a plastic substrate. In the following Examples, the above-mentioned water absorption layer (water absorption film) is to be formed on a glass substrate, a plastic substrate, and an optical component on which another film is formed.

Hereinafter, the present invention will be described based on the following Examples.

EXAMPLE 1

In Example 1, 10 parts by weight of polyvinyl alcohol (number-average polymerization: 2000; saponification: 88 mol %) were dissolved by heating in 100 parts by weight of water to prepare a solution. To this solution, a solution in which 0.5 parts by weight of hexamethoxymethylol melamine, 0.05 parts by weight of ammonium paratoluenesulfonate, and 0.3 parts by weight of 2,2',4,4'-tetrahydroxybenzophenone were dissolved in 100 parts by weight of methanol were added. The resultant mixture was stirred at room temperature for 30 minutes, thereby preparing an antifog coating solution. Then, 2.5 parts by weight of a methanol solution containing 20 w % of $SiO_2$ particles was mixed in the antifog coating solution, and the rate of the inorganic particles with respect to the concentration of a total solid content was set to be 5 w %.

The solution thus obtained was applied to a filter (substrate) of glass (white plate glass) having a thickness of 1 mm by dip coating, dried, and cured at 150° C. for 15 minutes, whereby a water absorption layer (thickness: 4 μm) was formed on both surfaces of the glass.

Thereafter, a first solution, in which 7.5 g of titanium tetraisopropoxide $(TiO\text{-iso-Pr})_4Pr: C_3H_7)$ is dissolved in 130 g of isobutyl acetate, was prepared. Then, a solution, in which 0.50 g of 2-normal HCl (2 mol/l Hydrochloric Acid) and 0.25 g of water are dissolved in 10 g of i-propanol, was mixed with 100 g of isobutyl acetate to prepare a second solution. The second solution was added to the first solution, and the resultant mixture was stirred at room temperature for 24 hours to set a hydrolysis ratio to be 0.75 to obtain a high refractive layer forming solution. The above-mentioned water absorption layer was soaked in the high refractive layer forming solution, pulled up by dip coating at 30 mm/min so as to coat the water absorption layer with the high refractive layer forming solution, and sintered at 150° C. for 5 minutes, whereby a high refractive layer was formed.

A layer (top layer) to be formed on the high refractive layer was obtained as follows: the antifog coating solution containing the above-mentioned inorganic particles was diluted with a mixture containing methanol and water at a ratio of 1:1 so that the viscosity became 14 cp to obtain a solution; and the solution thus obtained was applied onto the high refractive layer by dip coating, and sintered at 150° C. for 15 minutes, thereby adjusting the film thickness to 130 nm.

The antifog characteristics of the antifog film thus formed were evaluated by a method (Evaluation method 1) in which the breath is applied over the antifog film in an atmosphere of room temperature (temperature: 30° C., humidity: 80%) and whether fogging occurs is examined, and by a method (Evaluation method 2) in which the antifog film is transferred from a place at 5° C. to a place at room temperature (temperature 30° C.; humidity 80%) to observe whether fog develops on the film.

As a result, the antifog film produced in Example 1 was "not changed" according to both Evaluation methods 1 and 2.

Regarding the antireflection performance, the reflectance becomes about 0.035 with respect to light in the vicinity of a wavelength of 500 nm at which the reflectance becomes the lowest (FIGS. 1A and 1B).

The durability of the antifog film thus formed was evaluated by a method (Evaluation method 3) in which a sample is wiped thirty times with wiping paper (Dusper; produced by OZU Co., Ltd. Tokyo) while applying a load of 300 g and a change appearing on a lens surface is observed, and by a method (Evaluation method 4) in which a sample is wiped thirty times with wiping paper (Dusper; produced by OZU Co. Ltd. Tokyo) containing water while applying a load of 300 g and a change appearing on a lens surface is observed.

In both Evaluation methods 3 and 4, the result "there is no change" was obtained.

Furthermore, regarding the morphological stability, a filter was soaked in water, allowed to stand at a temperature of 60° C. and a humidity of 90% for 48 hours, and dried. Thereafter, the surface precision was observed by an optical interferometer. As a result, an increase of three neutron lines was observed as shown in FIGS. 1A and 1B.

COMPARATIVE EXAMPLE 1

In Comparative Example 1, 10 parts by weight of polyvinyl alcohol (number-average polymerization: 2000; saponification: 88 mol %) was dissolved by heating in 100 parts by weight of water to prepare a solution. To this solution, a solution in which 0.5 parts by weight of hexamethoxymethylol melamine, 0.05 parts by weight of ammonium paratoluenesulfonate, and 0.3 parts by weight of 2,2',4,4'-tetrahydroxybenzophenone were dissolved in 100 parts by weight of methanol were added. The resultant mixture was stirred at room temperature for 30 minutes, thereby preparing an antifog coating solution. Then, unlike in Example 1, the antifog coating solution is not mixed with the inorganic particles.

The solution thus obtained was applied to a filter (substrate) of glass (white plate glass) with a thickness of 1 mm by dip coating, and then was dried and cured at 150° C. for 15 minutes, whereby a water absorption layer (thickness: 4 μm) was formed on both surfaces of the glass.

Thereafter, a first solution, in which 7.5 g of titanium tetraisopropoxide $(Ti(O\text{-iso-Pr})_4Pr: C_3H_7)$ is dissolved in 130 g of isobutyl acetate, was prepared. Then, a solution, in which 0.50 g of 2-normal HCl and 0.25 g of water are dissolved in 10 g of i-propanol, was mixed with 100 g of isobutyl acetate to prepare a second solution. The second solution was added to the first solution, and the resultant mixture was stirred at room temperature for 24 hours to set a hydrolysis ratio to be 0.75 to obtain a high refractive layer forming solution. The above-mentioned water absorption layer was soaked in the high refractive layer forming solution, pulled up by dip coating at 30 mm/min so as to coat the water absorption layer with the high refractive layer forming solution, and sintered at 150° C. for 5 minutes, whereby a high refractive layer was formed.

A layer (top layer) to be formed on the high refractive layer was obtained as follows: the antifog coating solution was diluted with a mixture containing methanol and water at a ratio of 1:1 to obtain a solution having the viscosity adjusted to 14 cp; the solution thus obtained was applied to the high refractive layer by dip coating, and sintered at 150° C. for 15 minutes, thereby adjusting the film thickness to 130 nm.

The antifog characteristics of the antifog film thus formed were evaluated according to a method (Evaluation method 1) in which the breath is applied over the antifog film in an atmosphere of room temperature (temperature: 30° C., humidity: 80%) to examine whether fogging occurs, and by a method (Evaluation method 2) in which the antifog film was transferred from a place at 5° C. to a place at room temperature (temperature 30° C.; humidity 80%) to observe whether fogging occurs.

The result of Evaluation method 1 with respect to the antifog film formed in Example 1 was that "there is no particular change in antifog characteristics when the breath is applied at room temperature". The result of Evaluation method 2 was that "there is no particular change even when the antifog film is transferred from a place at 5° C. to a place at room temperature".

Regarding the antireflection performance, the reflectance becomes about 0.035 with respect to light in the vicinity of a wavelength of 500 nm at which the reflectance becomes the lowest (FIGS. 1A and 1B).

The durability of the antifog film thus formed was evaluated by a method (Evaluation method 3) in which a sample is wiped thirty times with wiping paper (Dusper; produced by OZU Co., Ltd. Tokyo) while applying a load of 300 g and a change appearing on a lens surface is observed, and by a method (Evaluation method 4) in which a sample is wiped thirty times with wiping paper (Dusper; produced by OZU Co. Ltd. Tokyo) containing water while applying a load of 300 g and a change appearing on a lens surface is observed.

In both Evaluation methods 3 and 4, the result "there is no change" was obtained.

Furthermore, regarding the morphological stability, a filter was soaked in water, allowed to stand at a temperature of 60° C. and a humidity of 90% for 48 hours, and dried. Thereafter, the surface precision was observed by an optical interferometer. Consequently, an increase of five neutron lines was observed as shown in FIGS. 1A and 1B.

EXAMPLE 2

In Example 2, 10 parts by weight of polyvinyl alcohol (number-average polymerization: 2000; saponification: 88 mol %) was dissolved by heating in 100 parts by weight of water to prepare a solution. To this solution, a solution in which 0.5 parts by weight of hexamethoxymethylol melamine, 0.05 parts by weight of ammonium paratoluenesulfonate, and 0.3 parts by weight of 2,2',4,4'-tetrahydroxybenzophenone were dissolved in 90 parts by weight of methanol were added. The resultant mixture was stirred at room temperature for 30 minutes, thereby preparing an antifog coating solution. Then, 12.5 parts by weight of a methanol solution containing 20 w % of $SiO_2$ particles was mixed in the antifog coating solution, and the rate of the inorganic particles with respect to the concentration of a total solid content was set to be 20 w %.

Hereinafter, an antifog film was produced by the same procedure as that in Example 1. The antifog film produced in Example 2 was evaluated by Evaluation methods 1 to 4.

The results of Evaluation methods 1 and 2 were both that "there is no particular change". The results of Evaluation methods 3 and 4 were also both that "there is no particular change".

Regarding the antireflection performance of the antifog film produced in Example 2, the reflectance becomes about 0.035 with respect to light in the vicinity of a wavelength of 500 nm at which the reflectance becomes the lowest (FIGS. 1A and 1B).

Furthermore, regarding the morphological stability, an antifog film (filter) was soaked in water, allowed to stand at a temperature of 60° C. and a humidity of 90% for 48 hours, and dried. Thereafter, the surface precision was observed by an optical interferometer. Consequently, an increase of two neutron lines was observed as shown in FIGS. 1A and 1B.

EXAMPLE 3

In Example 3, 10 parts by weight of polyvinyl alcohol (number-average polymerization: 2000; saponification: 88 mol %) were dissolved by heating in 100 parts by weight of water to prepare a solution. To this solution, a solution in which 0.5 parts by weight of hexamethoxymethylol melamine, 0.05 parts by weight of ammonium paratoluenesulfonate, and 0.3 parts by weight of 2,2',4,4'-tetrahydroxybenzophenone were dissolved in 73.6 parts by weight of methanol were added. The resultant mixture was stirred at room temperature for 30 minutes, thereby preparing an antifog coating solution. Then, 33 parts by weight of a methanol solution containing 20 w % of $SiO_2$ particles was mixed in the antifog coating solution, and the rate of the inorganic particles with respect to the concentration of a total solid content was set to be 40 w %.

Hereinafter, an antifog film was produced by the same procedure as that in Example 1. The antifog film produced in Example 2 was evaluated by Evaluation methods 1 to 4.

The results of Evaluation methods 1 and 2 were that "there is no particular change". The results of Evaluation methods 3 and 4 were also that "there is no particular change".

Regarding the antireflection performance of the antifog film produced in Example 2, the reflectance becomes about 0.035 with respect to light in the vicinity of a wavelength of 500 nm at which the reflectance becomes the lowest (FIGS. 1A and 1B).

Furthermore, regarding the morphological stability, an antifog film (filter) was soaked in water, allowed to stand at a temperature of 60° C. and a humidity of 90% for 48 hours, and dried. Thereafter, the surface precision was observed by an optical interferometer. Consequently, an increase of one neutron line was observed as shown in FIGS. 1A and 1B.

COMPARATIVE EXAMPLE 2

In Comparative Example 2, 10 parts by weight of polyvinyl alcohol (number-average polymerization: 2000; saponification: 88 mol %) was dissolved by heating in 100 parts by weight of water to prepare a solution. To this solution, a solution in which 0.5 parts by weight of hexamethoxymethylol melamine, 0.05 parts by weight of ammonium paratoluenesulfonate, and 0.3 parts by weight of 2,2',4,4'-tetrahydroxybenzophenone were dissolved in 45.4 parts by weight of methanol were added. The resultant mixture was stirred at room temperature for 30 minutes, thereby preparing an antifog coating solution. Then, 78 parts by weight of a methanol solution containing 30 w % of $SiO_2$ particles was mixed in the antifog coating solution, and the rate of the inorganic particles with respect to the concentration of a total solid content was set to be 70 w %.

Hereinafter, an antifog film was produced by the same procedure as that in Example 1. The antifog film produced in Comparative Example 2 was evaluated by Evaluation methods 1 to 4.

The results of Evaluation methods 1 and 2 were both that "there is no particular change". Furthermore, the result of Evaluation method 3 was that "fogging is observed", and the result of Evaluation method 4 was that "fogging is observed after 5 seconds."

Regarding the antireflection performance of the antifog film produced in Example 2, the reflectance becomes about 0.035 with respect to light in the vicinity of a wavelength of 500 nm at which the reflectance becomes the lowest (FIGS. 1A and 1B).

Furthermore, regarding the morphological stability, an antifog film (filter) was soaked in water, allowed to stand at a temperature of 60° C. and a humidity of 90% for 48 hours, and dried. Thereafter, the surface precision was observed by an optical interferometer. Consequently, an increase of neutron lines was not observed.

EXAMPLE 4

In Example 4, 10 parts by weight of polyvinyl alcohol (number-average polymerization: 2000; saponification: 88 mol %) was dissolved by heating in 100 parts by weight of water to prepare a solution. To this solution, a solution in which 0.5 parts by weight of hexamethoxymethylol melamine, 0.05 parts by weight of ammonium paratoluenesulfonate, and 0.3 parts by weight of 2,2',4,4'-tetrahydroxybenzophenone were dissolved in 90 parts by weight of methanol were added. The resultant mixture was stirred at room temperature for 30 minutes, thereby preparing an antifog coating solution. Then, 12.5 parts by weight of a methanol solution containing 20 w % of $SiO_2$ particles was mixed in the antifog coating solution, and the rate of the inorganic particles with respect to the concentration of a total solid content was set to be 20 w %.

The solution thus obtained was applied to a filter of glass (white plate glass) with a thickness of 1 mm by dip coating, dried, and cured at 150° C. for 15 minutes, whereby a water absorption layer (thickness: 4 μm) was formed on both surfaces of the glass.

Thereafter, a first solution, in which 7.5 g of titanium tetraisopropoxide (Ti(O-iso-Pr)$_4$Pr: $C_3H_7$) is dissolved in 130 g of isobutyl acetate, was prepared. Then, a solution, in which 0.50 g of 2-normal HCl and 0.25 g of water are dissolved in 10 g of i-propanol, was mixed with 100 g of isobutyl acetate to prepare a second solution. The second solution was added to the first solution, and the resultant mixture was stirred at room temperature for 24 hours to set a hydrolysis ratio to be 0.75 to obtain a high refractive layer forming solution. The above-mentioned water absorption layer was soaked in the high refractive layer forming solution, pulled up by dip coating at 30 mm/min so as to coat the water absorption layer with the high refractive layer forming solution, and sintered at 150° C. for 5 minutes, whereby a first high refractive layer was formed.

The antifog coating solution containing the above-mentioned inorganic particles was diluted with a solution, in which a mixture containing a water-absorbing polymer and $SiO_2$ particles at a weight ratio of 1:1 (50 w %) is mixed with methanol and water at a ratio of 1:1, to obtain a solution having the viscosity adjusted to 14 cp. The solution thus obtained was applied to the first high refractive layer by dip coating, and sintered at 150° C. for 5 minutes, thereby adjusting the film thickness to 10 nm. Furthermore, the water absorption layer was soaked in the high refractive layer forming solution, pulled up at 30 mm/min by dip coating, and sintered at 150° C. for 5 minutes to form a second high refractive layer.

A top layer was obtained as follows: the antifog coating solution containing the above-mentioned inorganic particles was diluted with a solution in which a mixture containing a water-absorbing polymer and $SiO_2$ particles at a weight ratio of 1:1 (50 w %) is mixed with methanol and water at a ratio of 1:1, to obtain a solution having its viscosity adjusted to 14 cp; the solution thus obtained was applied to the high refractive layer by dip coating, and sintered at 150° C. for 15 minutes, thereby adjusting the film thickness to 130 nm.

The antifog film produced in Example 4 was evaluated by Evaluation methods 1 to 4. The results of Evaluation methods 1 and 2 were both that "there is no particular change", as shown in FIGS. 1A and 1B. The results of Evaluation methods 3 and 4 were also both that "there is no change".

The reflectance becomes about 0.02 with respect to light in the vicinity of a wavelength of 500 nm at which the reflectance becomes the lowest (FIGS. 1A and 1B).

Furthermore, regarding the morphological stability, an antifog film (filter) was soaked in water, allowed to stand at a temperature of 60° C. and a humidity of 90% for 48 hours, and dried. Thereafter, the surface precision was observed by an optical interferometer. Consequently, an increase of two neutron lines was observed as shown in FIGS. 1A and 1B.

FIGS. 1A and 1B show tables summarizing film compositions, antifog characteristics, reflection characteristics, and the like of antifog and antireflection optical elements in Examples 1 to 4 and Comparative Examples 1 to 2.

EXAMPLE 5

FIG. 2 shows a camera (image pickup apparatus) including an optical element with the antifog film produced in Example 5. In FIG. 2, reference numeral 101 denotes a lens (zoom lens) body. The lens body includes: an image pickup optical system 102 which has one or a plurality of lens groups inside and is capable of changing a focal length by moving all or a part of the lens groups; a lens state detection unit 137 for detecting the focal length (i.e., zoom state) of the image pickup optical system 2; a driving unit 103 for adjusting a focal state by moving all or a part of the lens groups constituting the image pickup optical system 102; a storage means 104 such as a ROM; and a lens control unit 105 for controlling these components.

The lens state detection unit 137 detects a movement state of a lens that moves to change the focal length (zoom state) of the image pickup optical system 102 and the amount characterizing the movement state, by a known method, for example by using an electrode for an encoder provided in a lens-barrel that is rotated or moved for changing the focal length of the image pickup optical system 102, a detection electrode that is in contact therewith, and the like.

Reference numeral 106 denotes a camera body. The camera body 106 includes a main mirror 107, a focusing glass 108 on which an object image is formed, a pentaprism 109 for inverting an image, and an eyepiece 110, which constitute a finder system. The camera body 106 further includes a sub-mirror 111, a focal point detection unit 112, an operation unit 113, a camera control unit 114, and a film as an image-forming medium placed on an image-forming surface 115. Reference numeral 116 denotes a contact point provided in the lens body 101 and the camera body 106. When the lens body 101 and the cameral body 106 are mounted, various pieces of information are communicated and an electric power is supplied via the contact point 116.

It is preferable that an optical element with an antifog film of the present invention is provided in a finder optical system including the image pickup optical system 102, the pentaprism 109, and the eyepiece 110, because the fogging of the optical element can be prevented. In particular, among lenses (optical components) of the camera, the eyepiece 110 is a lens that is most frequently physically approached by a person. Therefore, the eyepiece 110 conventionally suffered from a problem that it is highly likely to fog. However, by adopting the optical element with the antifog film of the present invention for the eyepiece 110, such a problem has been solved.

Like in the above-mentioned camera, regarding a lens, a mirror, and the like that a person frequently approaches physically (i.e., a lens and a mirror exposed to the outside of the apparatus), by preferably applying the antifog film of the present example to the surface of the lens and the mirror, that is, by using the optical element of the present example for the lens, mirror, and the like that is frequently approached by a person), an antifog effect as well as an antireflection effect can be obtained. Therefore, even if a person approaches the lens, mirror, and the like, the surface of the optical element does not fog, and reflection and/or transmittance with good efficiency can be advantageously obtained.

As described above, it is appreciated that the present invention is applicable to not only an optical element (e.g., a lens, a mirror, a prism, a transparent parallel plate, etc.) provided with the antifog film, but also to optical equipment provided with the optical element of the present invention, such as a camera (an image pickup optical system, a finder optical system, etc.), a liquid crystal projector (an illumination optical system, a projection optical system, a polarizing plate, a liquid crystal panel substrate, etc.), and other various optical equipment.

As described above, according to the present example, it is possible to realize an optical element having both an antifog effect and antireflection characteristic as well as morphological stability, and optical equipment in which moisture condensation or the like does not occur when incorporating the optical element therein.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical element having an antifog characteristic, comprising:
   an optical component;
   a first water absorption layer containing a water-absorbing polymer which is formed on the optical component;
   a high refractive layer formed on the first water absorption layer; and
   a second water absorption layer containing a water-absorbing polymer, which is formed on the high refractive layer,
   wherein the first water absorption layer contains a mixture of a water-absorbing polymer and an inorganic substance, and
   wherein the inorganic substance is inorganic particles, which are mixed in the first water absorption layer in particulate form.

2. An optical element according to claim 1, wherein a rate of the inorganic substance mixed in the first water absorption layer is 5 to 60 w %.

3. An optical element according to claim 1, wherein a rate of the inorganic substance mixed in the first water absorption layer is 15 to 50 w %.

4. An optical element according to claim 1, wherein the inorganic substance is $SiO_2$.

5. An optical element according to claim 1, wherein the inorganic particles are contained in the first water absorption layer as particles having a diameter of 5 nm to 20 nm.

6. An optical element according to claim 1, wherein a thickness of the first water absorption layer is 1 μm to 20 μm.

7. An optical element according to claim 1, wherein the second water absorption layer contains the inorganic substance.

8. An optical element according to claim 1, wherein a thickness of the second water absorption layer is less than 1 μm.

9. An optical element according to claim 1, wherein a thickness of the second water absorption layer is less than 200 nm.

10. An optical element according to claim 1, wherein the optical element is formed by stacking a plurality of antireflection layers each consisting of the high refractive layer and the second water absorption layer that are integrally formed.

11. An optical element according to claim 1, wherein the water-absorbing polymer in at least one of the first water absorption layer and the second water absorption layer is a polyacrylic acid or polyvinyl alcohol.

12. An optical element according to claim 1, wherein the optical element is one selected from the group consisting of a filter for a photographic lens or a projection lens, a mirror, and a lens.

13. An optical element according to claim 1, further having an antireflection characteristic.

14. An optical equipment comprising an optical element as set forth in claim 1.

15. An optical equipment according to claim 14, wherein the optical element is exposed to the outside.

16. An optical equipment according to claim 14, wherein the optical equipment is an image pickup apparatus including an image pickup optical system and a finder optical system, the finder optical system including the optical element.

17. An optical equipment according to claim 16, wherein the optical element is an eyepiece of the finder optical system.

* * * * *

UNITED STATES PATENT AND TRADEMARK OFFICE
CERTIFICATE OF CORRECTION

PATENT NO. : 6,830,346 B2
DATED : December 14, 2004
INVENTOR(S) : Hideo Ukuda

It is certified that error appears in the above-identified patent and that said Letters Patent is hereby corrected as shown below:

Column 1,
Line 20, "a" should be deleted; and "e.g," should read -- e.g., --.

Column 2,
Line 12, "etc);" should read -- etc.); --; and
Line 52, "has" should read -- has an --.

Column 3,
Line 59, "1 mm" should read -- 1 $\mu$m --;
Line 62, "20 mm" should read -- 20 $\mu$m --; and
Line 65, "2 mm to 8 mm." should read -- 2 $\mu$m to 8$\mu$m. --.

Column 4,
Line 19, "Ti(O-iso-$C_3$H7)$_4$," should read -- Ti(O-iso-$C_3H_7)_4$, --;
Line 20, "Zr(O-t-$C_4H_9)_4$, Zr(O-n-$C_4H_9)_4$, (Ca(O$C_2$H5)$_2$," should read
-- Zr(O-t-$C_4H_9)_4$, Zr(O-n-$C_4H_9)_4$, (Ca(O$C_2H_5)_2$, --;
Line 27, "Zr(O-t-$C_4H_9$)," should read -- Zr(O-t-$C_4H_9)_4$ --; and
Line 50, "has" should read -- has an --.

Column 5,
Line 20, "(TiO-iso-Pr)$_4$" should read -- (Ti(O-iso-Pr)$_4$ --.

Signed and Sealed this

Thirty-first Day of May, 2005

JON W. DUDAS
*Director of the United States Patent and Trademark Office*